Patented Feb. 20, 1934

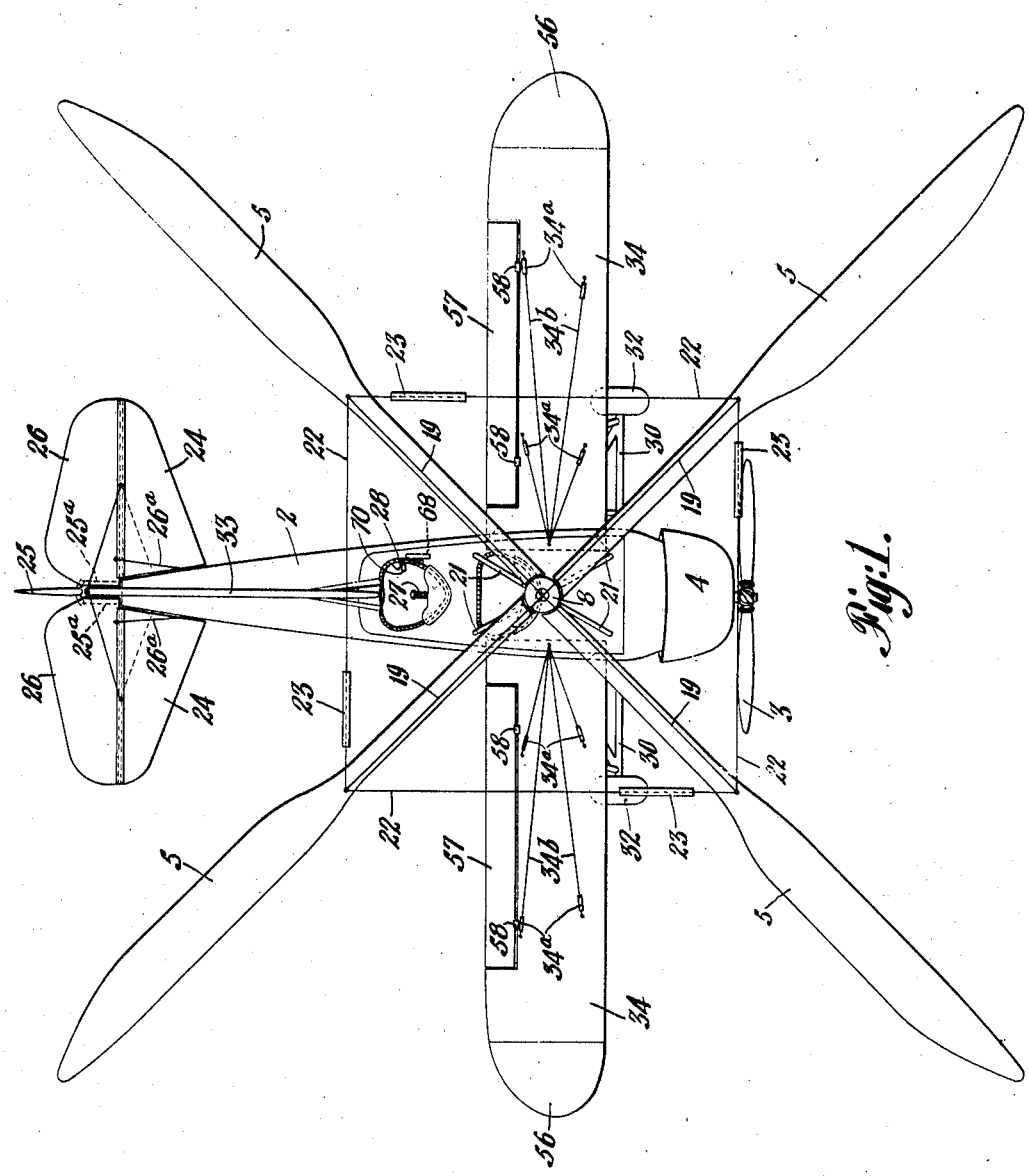

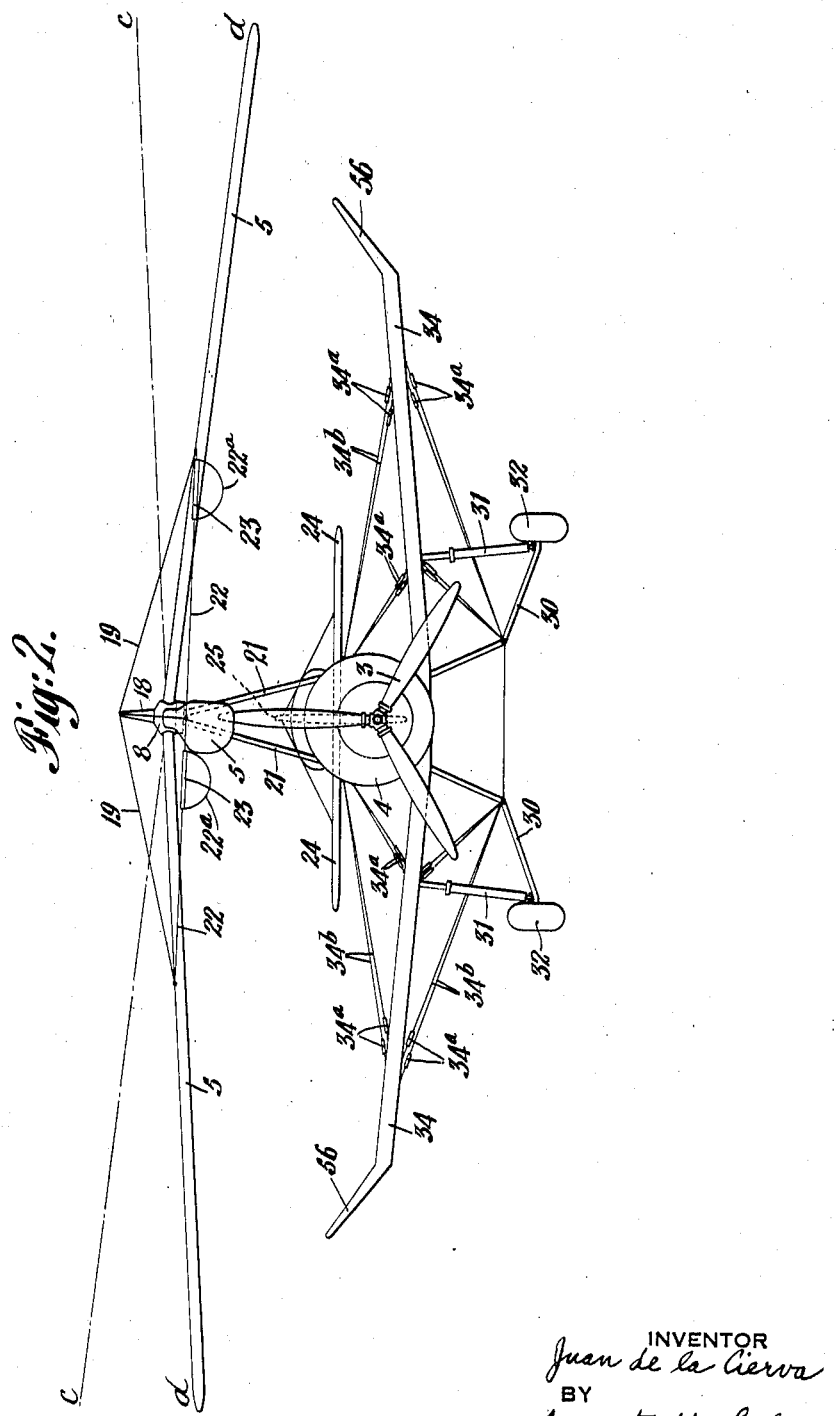

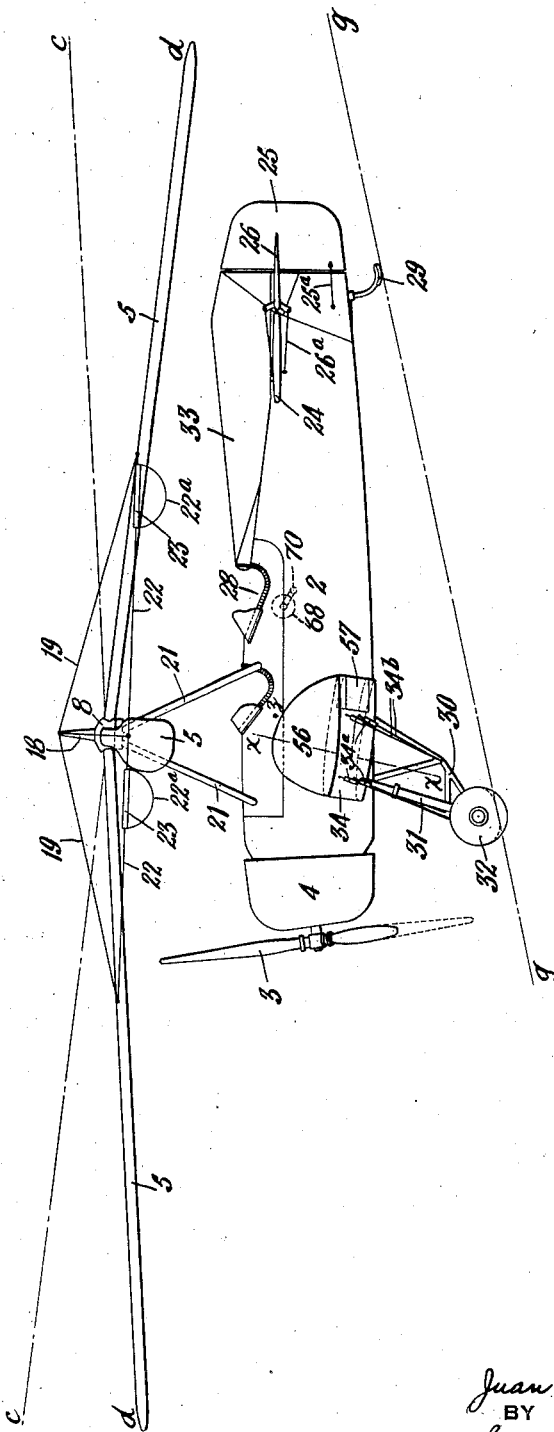

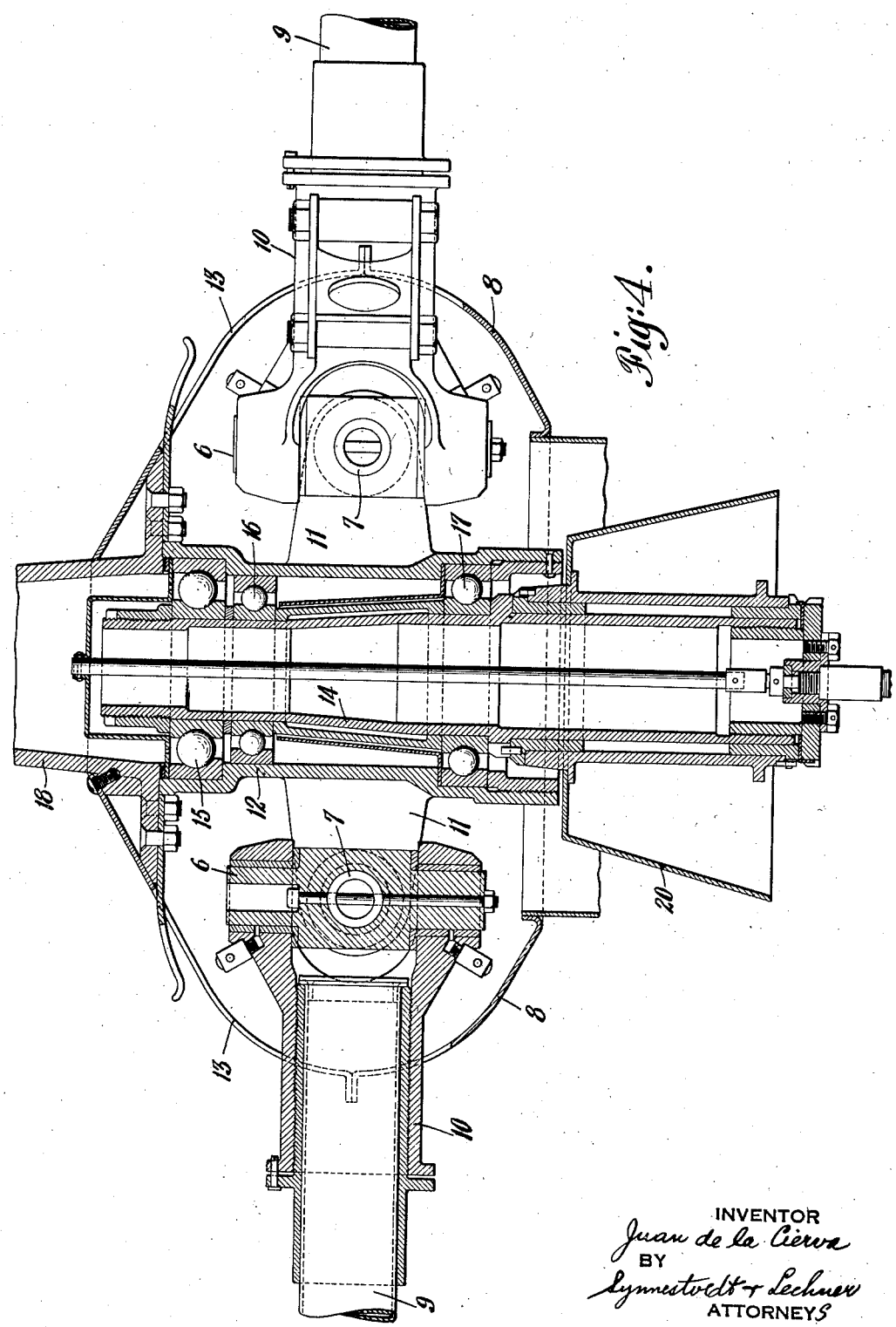

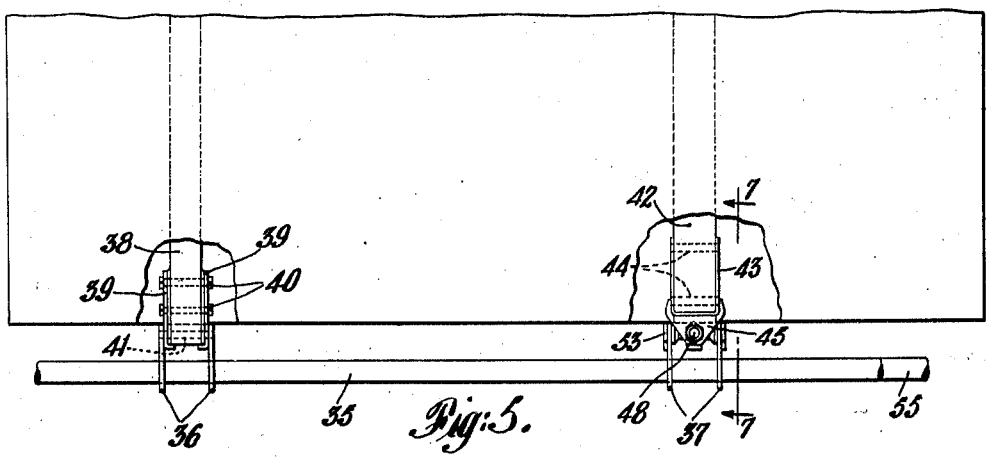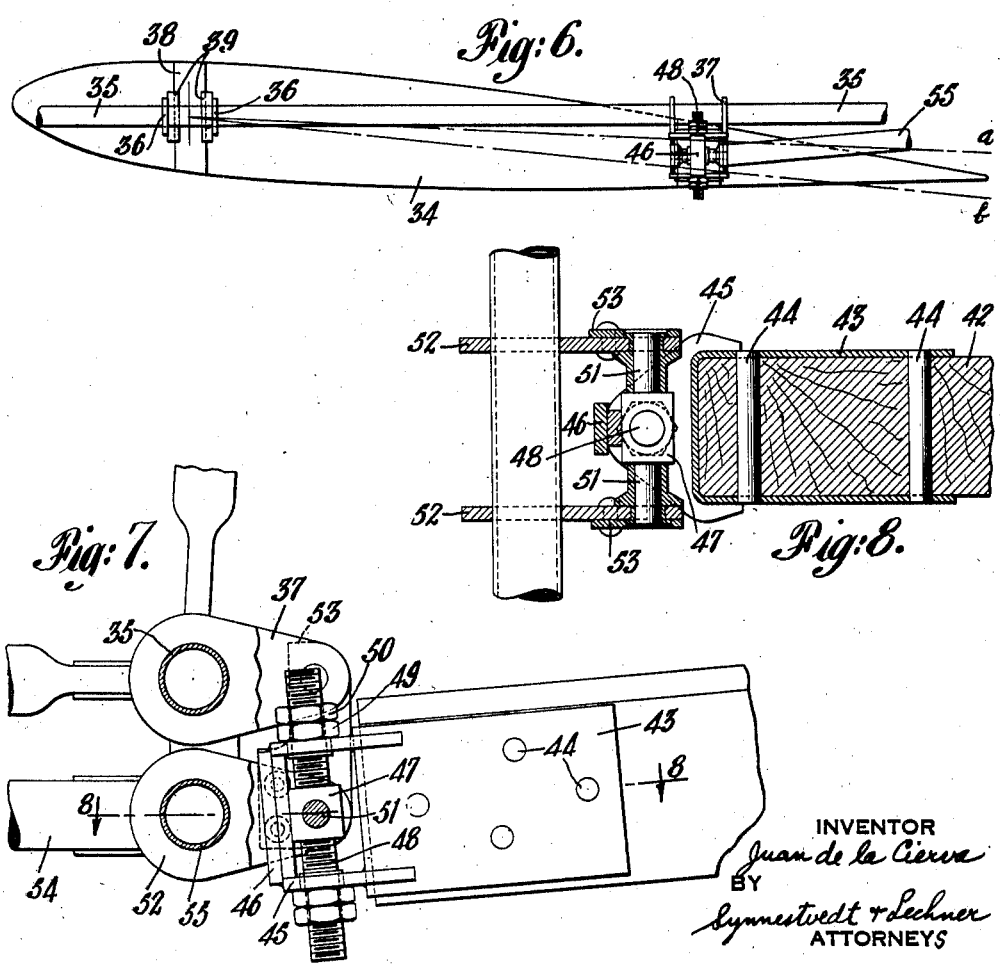

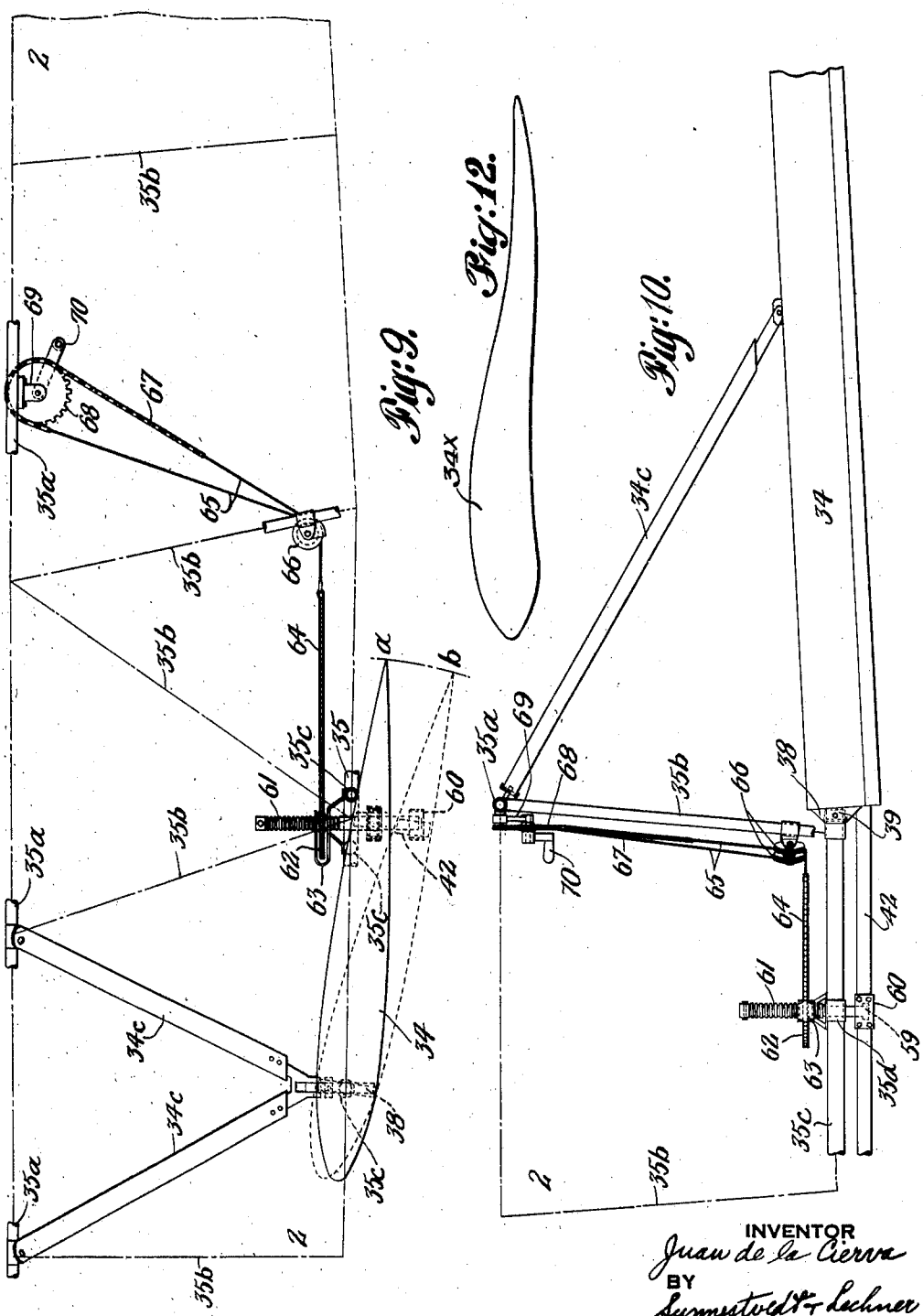

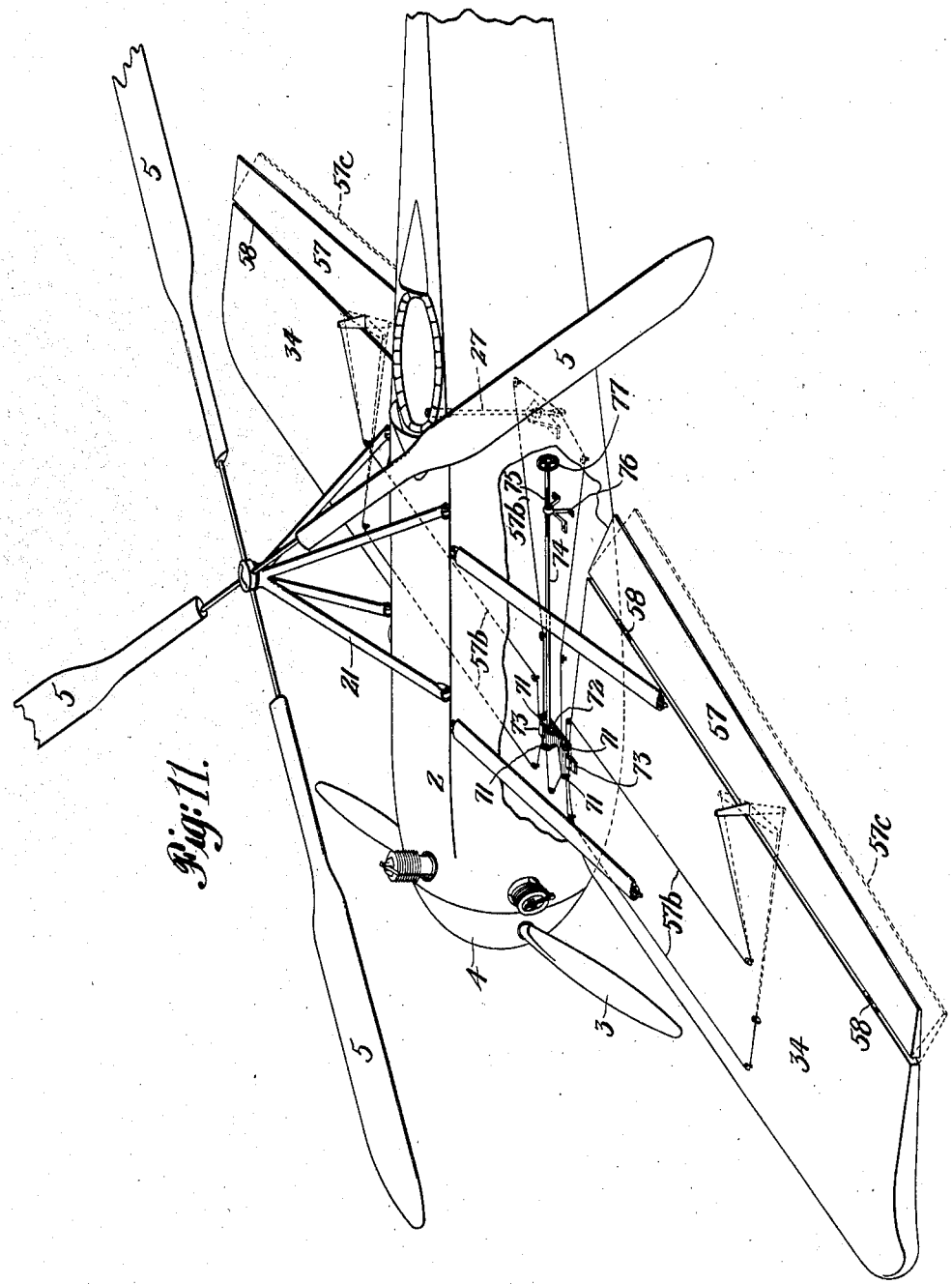

UNITED STATES PATENT OFFICE 1,948,455

AIRCRAFT WITH ROTATIVE WINGS

Juan de la Cierva, Madrid, Spain, assignor to Autogiro Company of America, Philadelphia, Pa., a corporation of Delaware Application December 18, 1929, Serial No. 414,901, and in Great Britain March 4, 1929

27 Claims. (Cl. 244—19)

This invention relates to aircraft with rotative wings, and is particularly applicable to aircraft having rotative supporting wings or blades actuable in whole or in part by the relative air-flow in flight.

In machines of this character the propelling force is preferably derived from an engine and propeller, which may be mounted at the front of the aircraft, and the lifting or sustaining of the aircraft is effected by means of a plurality of blades mounted for rotation about a common axis, which are rotated by the flow of air resulting from translational movement of the machine with relation to the atmosphere, the blades being pivotally mounted or otherwise arranged so that they are free independently to assume various positions under the influence of centrifugal, lift, and other forces.

One of the primary objects of the present invention is to improve the efficiency, stability, and controllability, particularly of aircraft of the above outlined general type.

Other objects of the invention involve the provision, in such aircraft, of automatic means for effecting lateral, directional, and longitudinal stability; controllable means for effecting these results; and means for mounting and supporting certain of such control means which shall also serve as auxiliary or supplemental sustaining means, cooperating with the rotative sustaining means in a novel manner to obtain certain desirable results hereinafter to be referred to.

More specifically, the invention contemplates the provision, in an aircraft, of substantially fixed wing means and rotative wing means, and the cooperative interrelation of the two, to obtain greater efficiency over aircraft either of the fixed wing type or of the rotative wing type, as well as to attain advantages with regard to the lift, stabilization, and general flying characteristics of the craft, including its proper control and maneuverability for straightaway flying, climbing and diving.

The invention further contemplates the proportioning of the relatively fixed wing means to the area of the rotative wing means, and the location and disposition of the two relative to each other and to the aircraft in such manner that while the major portion of the lift, or burden of sustention will be placed upon the rotative wing means, yet the ratio of the lift of the one to the lift of the other will vary with different attitudes of the aircraft, and that the rate of variation of this proportion will vary as between different zones or ranges of movement of the aircraft upwardly and downwardly from the horizontal; and the provision of means for altering the position or characteristics of the fixed wing means with relation to the rotative wing means or to the aircraft or to both, so as to alter the foregoing conditions.

Still another object of the invention is to ensure that the rotation of the rotative wings or surfaces, under the influence of the air-flow, be maintained at or near its optimum point for the greatest efficiency; and in this the invention contemplates also a form and/or disposition of the non-rotative or fixed wings which shall add to rather than detract from the attainment of this result.

The invention further involves various details of construction, as hereinafter set forth and claimed.

The foregoing, and other objects and advantages of the invention, should also be considered in the light of the fact that, in aircraft of the rotative-wing type, where the rotating sustaining unit, or rotor, is mounted above the body or fuselage of the machine, it must be mounted at a sufficient height to ensure that the wings in rotation or in their up and down oscillatory movement shall not foul any part of the machine (such as the rudder or the propeller), and this necessarily involves the raising of the center of gravity of the aircraft as a whole as compared to an ordinary fixed-wing airplane. This high center of gravity presents problems in regard to side-slipping and lateral and longitudinal stability which are peculiar to this type of aircraft, and which I aim to obviate or minimize by the present invention.

How the foregoing objects and advantages, together with such others as are incident to the invention or will occur to those skilled in the art, are attained, will be clear from the following description, taken together with the accompanying drawings, in which drawings:

Figure 1 is a plan view of an aircraft with rotative wings, embodying my improvements (certain details being omitted for the sake of clarity);

Figure 2 is a front elevational view of the aircraft of Fig. 1, with the rotative blades turned to a position 45° from that shown in Fig. 1;

Figure 3 is a side elevation of the aircraft, with the wings in the position of Fig. 2;

Figure 4 is an enlarged, fragmentary, vertical sectional view through the rotor-head of the wing system, showing details of the construction thereof;

Figure 5 is an enlarged, fragmentary plan view (with parts broken away) showing one form of attachment of a fixed-wing to the fuselage structure, which may be applied to the aircraft of Figs. 1, 2 and 3;

Figure 6 is an illustration of the structure of Fig. 5, giving an inner end view of the fixed-wing, and illustrating its range of adjustment;

Figure 7 is an enlarged detail view taken on the line 7—7 of Fig. 5 (with certain parts broken away);

Figure 8 is a section taken on the line 8—8 of Fig. 7, showing certain parts in elevation;

Figure 9 is an illustration of the preferred form of fixed-wing adjusting device, which is controllable from the cockpit of the aircraft of Figs. 1, 2 and 3, but the details of such means being omitted in those figures so as to avoid confusion;

Figure 10 is a front view of the structure shown in Fig. 9;

Figure 11 is a fragmentary perspective view of an aircraft showing a modified form of fixed wing adjustment applied thereto;

Figure 12 is a somewhat diagrammatic view illustrating a modified fixed wing section which I contemplate employing.

By reference first to Figs. 1, 2 and 3, it will be seen that I have illustrated an aircraft having a body or fuselage 2, at the front of which is the propelling means comprising a propeller 3 which may be driven by any suitable means, such as an engine (not shown) enclosed in the cowling 4; and above which is the usual sustaining unit or rotor, now commonly used on this type of aircraft, comprising a plurality of wings or blades 5 (four being here shown, although it will be understood that more or less than four may be employed) which may either be made flexible, or be flexibly mounted, or, as here shown (see Fig. 4) may be pivotally mounted, by means of vertical and transverse pivot means 6, 7, to a common center of rotation, so that they may be independently free to compensate or adjust themselves to variations in centrifugal, lift, and other forces. For the sake of clarity, the details of the rotative and pivotal mounting of the blades 5 are not shown in Figures 1 to 3, the streamline protecting shield or hood 8 of the mounting means or rotor head being the only part of this construction shown in said figures. From Figure 4, however, it will be seen that the inner end of the main, tubular supporting spar or beam 9 of each blade 5 is adjustably mounted (for pitch angle variation) in a socketed member 10 which is secured to the hub structure 11, 12, through the intermediation of the pivot means 6, 7 hereinbefore referred to. The vertical swinging of the blades 5 up and down out of their general plane of rotation, (as indicated at c, d, in Figs. 2 and 3) under variations in lift and centrifugal force, and their angular movements in the general plane of rotation, under changes in thrust and drag forces, are thus provided for, and the housing or hood 8 has openings 13 therein to permit such movement.

The hub member 12 is mounted for free rotation about the spindle or shaft 14 by means of suitable sets of radial and thrust ball bearings 15, 16 and 17. The cone or rotor head tip 18 is fixed with relation to the hub member 12, so that the wires, or other supporting means 19 (see Fig. 2) which support the blades when they are inactive, may revolve, as a unit, with the rotative wing system. The fixed member 14, at its lower end, is secured in the box or pylon apex 20, which is securely mounted on the quadrupod pylon or other supporting structure 21 above the fuselage 2. To prevent undue displacement of the blades 5 angularly in their general plane of rotation, as shown in Figure 1, when they are revolving at slow speeds or are at rest, they may be flexibly interconnected by the usual means, comprising cables 22, in each of which an elastic, such as the rubber shock absorber cord 23, may be interposed. As a precautionary measure, the flexible members 23 may be jumped or by-passed by a slack section of cable 22a, as best shown in Figure 2.

The foregoing general arrangement of rotor, or sustaining unit, is not, per se, a part of the present invention, but is described in detail because of its relation to other parts of the aircraft, as will hereinafter appear. However, certain of the features shown are claimed herein, while others are claimed in my copending application Serial No. 496,872, filed November 20th, 1930.

At the rear or tail of the fuselage or body 2 are mounted the stabilizer 24 and directional and vertical control members 25 and 26, termed the rudder and elevator, the rudder being controlled through cables 25a by means of the usual rudder bar (not shown) in the cockpit, while the elevator is controlled by cables 26a connected in the usual manner to the control stick 27 in the cockpit 28.

As will be seen from Figures 2 and 3, the aircraft is also provided with a tail skid 29 and suitable landing gear, including the bracing structure 30, shock absorbers 31 and wheels 32, the wheels preferably being resilient or flexible, as in the all-rubber type, so that the wheels and shock absorbers together will provide sufficient vertical travel to take the final thrust of the vertical descent of which the machine is capable, the ground line with respect to the machine when at rest being indicated by the line g—g in Fig. 3.

In accordance with the present invention I provide an elongated fin 33, preferably of large area, which, in this instance, I have extended from the rear cockpit 28 right back to the rudder 25. This fin, or stabilizing surface, is preferably mounted along the top of the fuselage, beneath the disk area traversed by the blades 5 when in rotation, and it extends substantially on a line with, or parallel to a longitudinal vertical central plane through the aircraft.

In addition to this elongated fin 33, which tends toward automatic stability of the aircraft, directionally, I further minimize detrimental effects of the high center of gravity of the machine by a structure, now to be described, which has a novel and advantageous cooperation with the rotative sustaining blade system.

As seen in Figures 1 to 3, I have provided the aircraft with auxiliary or supplemental sustaining means comprising in the preferred embodiment herein illustrated, a pair of substantially fixed wing members 34, extending laterally from the lower portion of the fuselage 2. These auxiliary supporting surfaces may be multi-plane or monoplane, but in any case are of relatively small area as compared to the disk area of rotation of the auto-rotative blades 5 (as best seen in Figure 1), and they attain a number of desirable results, now to be set forth.

I have found that the lift of the rotative surfaces increases with the angle of incidence of the aircraft more slowly at small angles of incidence, and then more rapidly at greater angles of incidence, than does the lift of the fixed wings, as the fixed wings are located below the wind driven rotating wings and receive the down-wash of the same, and that, therefore, the proportion of the total lift supplied by the fixed wings increases as the angle of incidence of the aircraft diminishes, provided that the rotative system as a whole, and the fixed wing system, are so set with relation to the aircraft and to each other that the "no-lift" incidence for both fixed and rotative wings is about the same. If the incidence of the fixed wings is greater than that of the rotating wings, this effect is considerably increased. Under such circumstances the rotational speed of the rotating surfaces tends to decrease at high forward speeds, and in diving at steep angles. (When referring to angles of incidence of the rotative or fixed wing systems it is to be hereinafter understood that this is compared with the attitude of neutral or "no-lift" incidence.)

In order to counteract this effect and to maintain the rotational speed near its optimum value, in accordance with the present invention, I preferably set the fixed wings with an incidence somewhat smaller than that of the rotative system. By so doing I provide that the proportion of the tital lift taken by the fixed wings will, as the angle of incidence of the aircraft diminishes, increase at first and then decrease at high flying speeds, and in the case of a steep dive the fixed wings will give a negative lift, (or downward pressure) which will have to be balanced by the rotating wings, and the latter will, therefore, not only maintain their rotational speed (it being understood that they are held out in operative position by the centrifugal force of their rotation under the influence of the relative air flow) but will actually maintain a speed of rotation near the optimum point, or point of greatest efficiency. I, therefore, obtain increased inherent stability and safety by this combination of fixed and freely rotative wings, and considerably greater efficiency over aircraft of the rotative wing type as heretofore constructed, as well as over aircraft of the ordinary fixed-wing type, when operating under certain conditions, such, for example, as high speed flight.

To obtain the greatest flexibility of arrangement, particularly in aircraft which for any purpose should be capable of diving at steep angles (for example, warplanes) I may make the fixed wings, either wholly or in part, adjustable as to angle of incidence, either by an independent adjustment or control, or by an adjustment or control combined with controlling means for the tail surfaces of the aircraft, so that the fixed wing means may be adjusted, on the one hand, to the most efficient angle of incidence for normal flying, and, on the other hand, to give a variable negative lift for diving. To this end, I preferably provide means for adjusting the fixed wing through an angle pivoting around an axis extending substantially longitudinally through the fixed wing. By reference to Figures 5 to 8, inclusive, (in which a portion, only, of one form of adjustably fixed wing is illustrated) it will be seen that the lower longéron 35 of the fuselage (omitted from the general views so as not to complicate the drawings) may be fitted with suitable wing supporting means, such as the ears 36—36 and 37—37 here provided.

To the fixed ears 36 the forward main longitudinal spar or beam 38 of the wing may be detachably secured, as by the beam hinge plates 39, bolts 40 and hinge or coupling pin 41. The rear main spar or beam 42 has secured to it a yoke or U-member 43, as by bolts or rivets 44. Extending from the yoke is a bracket-like structure 45—46 (as seen best in Figures 7 and 8) and within this structure is positioned a block 47, slidable against the inner surface of the member 46, through which block a threaded bolt or pin 48 extends, on a substantially vertical axis. Adjusting and lock nuts 49 and 50 are threaded on the ends of said pin to bear against the members 45. The block itself is carried on a transverse pin member 51 mounted in the ears 52 (see Figure 7) which, as here shown, are secured by plate members 53 to ears 37, and which receive additional support from the transverse fuselage frame member 54 and the longitudinally extending bracing member 55 (see in Figures 5, 6 and 7).

From an examination of Figure 6, it will be seen that, by the above described means, the incidence of the fixed or stub wing may be altered between lines indicated at a, b, the hinge arrangement at the front beam 38 permitting sufficient flexibility for a limited degree of pivotal movement on an axis substantially aligned with the length of the front beam. It will be seen from Figures 1 and 2 that (if an externally-braced wing be used) guy wires 34b, and turn-buckles 34a may be provided, so that, if the alteration of adjustment of the wing is to be carried out over its entire area, the length of the guy wires may be adjusted accordingly. It should be understood, however, that I preferably employ relatively thick, internally braced fixed wings, eliminating the guy wires altogether, and provide a sprocket and chain or pulley and cable, or other suitable means for varying the adjustment of the fixed wings from the cockpit of the machine, while in flight, in order to obtain the greatest range of usefulness of the device.

This preferred arrangement of adjusting the fixed wings 34 of Figs. 1, 2 and 3 (which is omitted therefrom for the sake of clarity) is shown in enlarged detail in Figs. 9 and 10. I have here illustrated in dot-and-dash outline the fuselage 2; and, in elevation, portions of the right lower longéron 35, left upper longéron 35a, and vertical, transverse and central longitudinal members 35b, 35c, and 35d of the fuselage framing.

The forward main beam 38 of wing 34 is secured by suitable hinge plates 39 to the fuselage, while the rear beam 42 is extended just beneath the fuselage, for engagement, at the mid-point of the fuselage, with a foot 59 which has fore-and-aft sliding movement in a socket or seat 60 secured on the wing beam extension 42. The foot 59 is a rigid part of a vertical, threaded rod or worm 61, and moves the wing beam upwardly and downwardly when said rod is moved, the vertical movement of the rod (which is fixed as against rotative movement) being effected by rotation of the internally threaded sprocket 62, which is fixed as against vertical movement by the supporting structure 63, the latter being rigidly mounted in the fuselage, as on a pair of the transverse members 35c (shown in Fig. 9).

Rotation of sprocket 62 is effected by means of a chain section 64, connected by cables 65 (which pass over pulleys 66, mounted on one of the vertical members 35b of the fuselage) to a chain section 67, which in turn is actuated by sprocket 68, supported on the left upper longéron 35a by a bracket 69, and rotatable by the crank or handle 70 which is positioned in the rear cockpit 28 shown in Figs. 1 and 3.

If the adjustment of fixed wings 34 is to be substantial (as indicated at points a, b, in Fig. 9) I preferably provide a two-armed support 34c for each wing extending from spaced points along longéron 35a to a single point on the wing adjacent the front beam 38.

In addition to all of the foregoing, I employ the fixed wings for other purposes, and as will be seen from Figures 1 to 3, I have provided them, at their tips, with up-turned or angularly disposed fixed stabilizing vanes or surfaces 56, which tend toward automatic lateral equilibrium of the aircraft. Owing to the fact that they are located at a considerable distance from the fuselage, these up-turned tips may be made relatively small and yet exert a considerable influence on lateral stability and minimize side slipping of the craft which is otherwise apt to occur, owing to the high center of gravity of the machine with relation to the lateral center of pressure of fuselage, wheels, struts, etc.

Furthermore, the fixed wings while adding both to the lift and to the efficiency of the aircraft, also provide a means on which I may mount controllable lateral stabilizing surfaces or ailerons 57, which are preferably hinged to the fixed wing at the points 58 and are controlled in the usual manner from the cockpit by the ordinary control stick 27, through the usual aileron control wires, (omitted from Figs. 1, 2 and 3 to avoid confusion). Stability, both automatic (as obtained from the wing tips 56 and the longitudinal fin 33) and controllable (obtained by the ailerons 57) may be further improved by mounting the wings 34 at a dihedral angle as shown in Figure 2.

By reference to Fig. 11, it will be seen that, as an alternative to the adjustment arrangement of Figs. 9 and 10, or as a means supplemental thereto, I have devised an arrangement whereby said ailerons 57, which are normally oppositely actuated by the control stick 27 and cables 57b, may also be controlled to move together, as flaps, through a range of adjustment indicated by the dotted outline 57c. To this end, I pass the usual control cables 57b over small pulleys 71, which are mounted on a sliding plate 72 secured in suitable guides 73, said plate being movable forwardly and rearwardly by means of the control rod 74 which is threaded, as at 75, in a fixed support 76, and rotatable by a wheel 77, in the cockpit. Movement of the plate 72 rearwardly will be seen to move the ailerons downwardly, together, without interfering with their proper control by the stick 27. The desired co-operative relation between the effective incidence of the fixed wings and that of the rotative wing system may thus be obtained by operating the ailerons as flaps.

To increase longitudinal stability, I preferably form the fixed wings of such an aerofoil section as to give a substantially fixed center of pressure, and so located and set them that the lift line of action $x$—$x$ passing through the center of pressure is in advance of the center of gravity $z$ of the aircraft, (as indicated in Fig. 3), so creating a stabilizing moment. Longitudinal stability may be still further increased by employing "S-shaped" or "reflex" aerofoil sections such as shown at 34$x$ in Figure 12, with the center of pressure situated normally in advance of the center of gravity of the aircraft. As the center of pressure of this type of aerofoil moves rearwardly when giving a negative lift, provided the center of gravity of the aircraft is about midway between the line of positive lift in normal flight and the line of negative lift in a steep dive, a restoring couple is produced during a dive which tends to bring the aircraft back to normal horizontal flight. It will, therefore, be seen that, as an alternative to providing adjustment means on the fixed wings, or in association therewith, an aerofoil section may be used which will also cooperate with the rotative wing system to attain the desired results in the way of longitudinal stability and maneuverability. A variable camber wing might also be employed for this purpose.

In conclusion, it will now be seen that, by combining with the wind-driven aerofoil system a suitable fixed wing system, as well as by the other features of construction hereinbefore set forth, I am enabled to attain the objects and advantages set out in the first part of this specification, including greatly increased efficiency, lateral, directional, and longitudinal stability and maneuverability, structural advantages, greater safety, and other desirable objects.

What I claim is:—

1. In an aircraft having as its primary means of sustention, a system of pivotally and rotatably mounted sustaining wings or blades arranged for normal actuation by relative air-flow and to provide substantially a single point of support for the craft generally vertically above the center of gravity, by which construction relatively steep and even vertical descent is made possible, forward propulsion means, and stabilizing surfaces for the craft, the rotary wings and stabilizing surfaces being cooperatively arranged to provide a substantial degree of automatic stability both in forward flight and in relatively steep or vertical descent, said surfaces including a pair of fins relatively widely spaced at opposite sides of the body of the craft and arranged at a materially upwardly and outwardly inclined angle below the general path of travel of the rotating wings, whereby to cooperate with said rotary wings to provide a material degree of automatic lateral stability, and generally laterally extending supplemental and normally fixed lifting surfaces, below said rotor system, so positioned with respect to the center of gravity of the craft and having such an incidence setting with respect to a plane perpendicular to the axis of the rotor that, both in forward flight and in vertical descent, a material degree of automatic attitude stability is afforded.

2. An aircraft, having as its primary sustention means, a system of pivotally and rotatably mounted sustaining wings or blades arranged for normal actuation by relative air-flow so as to provide for relatively slow translational flight and even vertical descent of the craft, a mounting structure for the rotative blades disposed above the body of the craft to provide substantially a single point of pendular support therefor, supplemental and normally fixed lifting wings extended at opposite sides of the craft below the rotor, sharply upwardly and outwardly inclined automatic lateral stabilizing surfaces carried by said supplemental fixed wings, and manually controllable lateral stabilizing surfaces also carried by said fixed wings, whereby a substantial degree of automatic lateral stability is afforded by said sharply inclined surfaces even in relatively slow translational flight or vertical descent, and whereby additional manual lateral control is afforded by said controllable surfaces.

3. An aircraft having as its primary means of sustention, a system of pivotally and rotatably mounted sustaining wings or blades arranged for normal actuation by relative air-flow in flight and disposed above the body of the craft to provide substantially a single point of pendular support therefor, by which construction relatively slow translational flight and even vertical descent is made possible, and supplemental and normally fixed lifting surfaces for the craft extended at opposite sides of the body, below said rotative wings, and having tip portions inclined upwardly and outwardly at a relatively steep angle, by which combination a substantial degree of automatic lateral stability is provided even when traveling at a relatively low speed or in vertical descent.

4. An aircraft having as its primary means of sustention, a system of pivotally and rotatably mounted sustaining wings or blades arranged for normal actuation by relative air-flow in flight and disposed above the body of the craft to provide substantially a single point of pendular support therefor, by which construction relatively slow translational flight and even vertical descent is made possible and in which construction the center of gravity of the craft as a whole is located relatively high, and non-rotative and normally fixed supplemental sustaining wings below the center of gravity of the craft, having upturned tips arranged below the general path of travel of the rotative wings whereby to cooperate, in their effect, with the effect of the pendular support of the craft in producing a material degree of automatic lateral stability.

5. In an aircraft, the combination of a primary sustaining system of normally air rotated wings, means of forward propulsion, fixed wings extended laterally at each side of the craft beneath the rotative wings, upturned fins adjacent the ends of said fixed wings set at such an angle as to cooperate with the one point of support of the rotative wings to produce substantial lateral stability, and ailerons carried by the fixed wings and extending outwardly thereon to a point close to said upturned fins.

6. An aircraft having as its primary means of sustention, a system of pivotally and rotatably mounted sustaining wings or blades arranged for normal actuation by relative air-flow in flight and disposed above the body of the craft to provide substantially a single point of pendular support therefor, by which construction relatively slow translational flight and even vertical descent is made possible, and supplemental and normally fixed lifting surfaces for the craft extended at opposite sides of the body, below said rotative wings, and set at a pronounced positive dihedral, together with stabilizing surfaces carried by said fixed lifting surfaces and set at an additionally upwardly and outwardly inclined angle with respect thereto, whereby the dihedral setting of said fixed surfaces and the sharply angled setting of said stabilizing surfaces cooperate with each other and with the rotative wings to provide a substantial degree of automatic lateral stability even in relatively slow translational flight or in vertical descent.

7. An aircraft including a sustaining rotor composed of swingingly and rotatably mounted blades, a rudder, an elevator, control means for the rudder and elevator, and lateral stabilizing means for the craft including aerofoils disposed at opposite sides of the craft and arranged at a pronounced dihedral, said aerofoils being of sufficient size or effect to produce proper banking under the influence of rudder deflections.

8. An aircraft having as its primary means of sustention, a system of continuously turning pivotally and rotatably mounted sustaining wings or blades positioned and arranged for actuation by relative air-flow in all styles of flight of the craft and disposed above the body of the craft to provide substantially a single point of support approximately above the center of gravity thereof, by which construction relatively slow translational flight and even vertical descent is made possible, and small lateral stabilizing surfaces for the craft disposed in relatively widely spaced-apart relation at opposite sides of the body thereof, below said rotative wings, and extended upwardly and outwardly at a relatively high angle, by which combination a substantial and approximately uniform degree of automatic lateral stability is provided whether traveling at a high or at a relatively low forward speed or in vertical descent.

9. An aircraft having a main sustaining system of freely rotative wings continuously driven by the relative air-flow in all flight operation of the craft, propelling means, a pair of fixed fins forming a pronounced dihedral angle, the members of such pair being disposed, respectively, on either side of the aircraft, and in their entirety within the influence of air deflected by the rotative wings outside of the slipstream from the propelling means.

10. In an aircraft, a primary sustaining system of swingingly and rotatively mounted wings normally actuable by relative air-flow in flight, in which construction the lift line of said system shifts to different positions under different flight conditions, and aerodynamically actuated means automatically operative under the influence of such changes in flight conditions to provide a compensating force acting to balance such shifts in the lift line.

11. In an aircraft having as its primary means of sustention, a system of pivotally and rotatably mounted sustaining wings or blades arranged for normal actuation by relative air-flow and to provide substantially a single point of support for the craft generally vertically above its center of gravity, by which construction relatively steep and even vertical descent is made possible, forward propulsion means, and stabilizing surfaces for the craft, the rotary wings and stabilizing surfaces being cooperatively arranged to provide a substantial degree of automatic stability both in forward flight and in relatively steep or vertical descent, said surfaces including a pair of fins relatively widely spaced at opposite sides of the body of the craft and arranged at a materially upwardly and outwardly inclined angle below the general path of travel of the rotating wings, whereby to cooperate with said rotary wings to provide a material degree of automatic lateral stability under all flight conditions, and a substantially vertically extended fin also disposed below the general path of travel of the rotating wings and spaced rearwardly substantially from the rotor axis to cooperate, in its effect, with the effect of the rotary wings, in producing a material degree of automatic directional stability.

12. In an aircraft, the combination of a body, a primary sustaining system of flexibly mounted rotative wings positioned above the body and arranged with its center of lift substantially above the center of gravity of the craft as a whole, and relatively fixed surfaces positioned laterally of the craft of such an area and arranged at such distance and angle with respect to the center of gravity of the craft that the direction of reaction of said surfaces upon relative lateral movement with respect to the atmosphere extends generally above said center of gravity and is of such magnitude as to produce a banking moment, in normal flight operation, substantially neutralizing tendency to skid.

13. In an aircraft, the combination of a body, a primary sustaining system of flexibly mounted rotative wings positioned above the body and arranged with its center of lift substantially above the center of gravity of the craft as a whole, said center of gravity being so located as to produce a preponderance of fin area therebelow, and relatively fixed surfaces positioned laterally of the craft of such an area and arranged at such distance and angle with respect to the center of gravity of the craft that the direction of reaction of said surfaces upon relative lateral movement in the atmosphere extends generally above said center of gravity and is of such magnitude as to produce a banking moment, in normal flight operation, more than sufficient to counteract the reverse banking tendency which arises from a preponderance of effective fin area below the center of gravity.

14. In an aircraft of the character described, forward propelling means, a hub member mounted so that it may be freely rotated, rotative sustaining blades swingingly mounted on said hub member so as to lie, in mid-position, substantially radially of, and in a substantially flat plane perpendicular to, the rotational axis, whereby they will be rotated and swung by relative airflow and other forces in flight, and means whereby the incidence of the several blades may be adjusted each to each with respect to said plane, said last means including a screw-threaded mounting for each blade and securing means therefor.

15. In an aircraft, the combination with the body of the craft, of a primary sustaining system comprising a generally upright axis member, means mounting the same for free rotation, and a plurality of elongated aerofoil wings pivotally secured thereto in position to be autorotatively turned by the relative air-flow in flight, means for propelling the craft in the general direction of its longitudinal axis, whereby the rotor is subjected to substantially edgewise movement in high speed forward flight and to downward axial movement in vertical descent with power off, a supplemental normally fixed lifting surface beneath the rotor of relatively small area as compared with the total area covered by the rotary wings in their circle of rotation and thus of a lifting capacity which is only a fraction of the lifting capacity of the rotor, and means for variably controlling at will the relative lift produced by the rotor and the fixed wing at a given flight attitude of the longitudinal axis of the craft.

16. In an aircraft, the combination with the body of the craft, of a primary sustaining system comprising a generally upright axis member, means mounting the same for free rotation, and a plurality of elongated aerofoil wings pivotally secured thereto in position to be autorotatively turned by the relative air-flow in flight, means for propelling the craft in the general direction of its longitudinal axis, whereby the rotor is subjected to substantially edgewise movement in high speed forward flight and to downward axial movement in vertical descent with power off, a supplemental normally fixed lifting surface beneath the rotor of relatively small area as compared with the total area covered by the rotary wings in their circle of rotation and thus of a lifting capacity which is only a fraction of the lifting capacity of the rotor, and means for varying at will the relative setting of the fixed wing incidence and the rotor incidence considered as a whole, whereby the fixed wing is employed to exert a controllable regulating effect upon the aerodynamic or autorotational action of the rotor.

17. In an aircraft, the combination of a body, means of forward propulsion, a rotor or primary sustaining system of normally air rotated wings including a single common upright axis extended above the body and a plurality of wing members each individually articulated to said axis, the individual articulation of each wing comprising a substantially horizontal pivot and a substantially vertical pivot, whereby each wing in all attitudes of flight may swing up and down as well as forwardly and rearwardly with respect to the rotational path under the action of flight forces, especially in forward flight produced by said propulsion means, and supplemental normally fixed wings beneath the rotative wings, said fixed wings being of an area capable of assuming a minor share of the total lift and constructed and positioned at such incidence as to produce a variable lift, with relation to the lift of the rotor, in accordance with variations in the attitude of the craft, whereby to vary the load on the rotor and to effect a variable controlling influence upon the swinging of the individual wings on their vertical pivots.

18. In an aircraft, elevators or horizontal rudders and a control member therefor, freely rotative wings and stationary wings, means for mounting the stationary wings in such a manner that their angle of incidence may be controlled by the pilot of the aircraft, in flight, independently of the rotative wings, including control connections so arranged that when the aircraft is in an attitude to the relative airflow in which the rotative wings very nearly give "no lift", as for instance in a steep dive, the stationary wings may be set to give a small negative lift or downward force, while permitting the pilot at other times to set the stationary wings to an increased angle (relative to the aircraft), so that said stationary wings may operate at their most efficient angle of incidence in normal flight, in which construction the incidence control of the stationary wings is effected by means of the member controlling the elevators or horizontal rudders of the aircraft in conjunction with the control of said elevators.

19. In an aircraft having freely rotative wings and fixed wings carrying ailerons or flaps, means for mounting and controlling the ailerons in such a manner that the angle of incidence of said ailerons or flaps on both sides of the aircraft may be controlled by the pilot of the aircraft in flight, independently of their differential control for lateral balancing purposes so that when the aircraft is in an attitude to the relative airstream in which the rotative wings very nearly give "no lift" as for instance in a steep dive, the fixed wings and ailerons may be set to give a small negative lift or downward force, while permitting the pilot at other times to alter the aileron setting so as virtually to increase the camber and angle of incidence of the fixed wings, thus ensuring that the fixed wings may operate at their most efficient angle of incidence in normal flight.

20. In an aircraft having elevators, freely rotative wings and fixed wings carrying ailerons or flaps, means for mounting and controlling the ailerons in such a manner that the angle of incidence of said ailerons or flaps on both sides of the aircraft may be controlled by the pilot of the aircraft in flight, independently of their differential control for lateral balancing purposes so that when the aircraft is in an attitude to the relative airstream in which the rotative wings very nearly give "no lift", as for instance in a steep dive, the fixed wings and ailerons may be set to give a small negative lift or downward force, while permitting the pilot at other times to alter the aileron setting so as virtually to increase the camber and angle of incidence of the fixed wings, thus ensuring that the fixed wings may operate at their most efficient angle of incidence in normal flight, the conjoint control of the ailerons or flaps being effected by means of a member controlling the elevators in conjunction with the control of the latter.

21. An aircraft having as its primary sustention means, a rotor system of pivotally and rotatably mounted sustaining wings or blades arranged for normal actuation under the influence of relative airflow in flight to provide for normal flight of the craft in attitudes varying from substantially horizontal forward translational flight to vertical descent, forward propulsion means, supplemental and normally fixed sustaining wings disposed on the craft below said rotor system, in which construction the supplemental wings have a variable effect on the action of the rotor in different attitudes of flight, and means for adjusting the effective incidence of the fixed wings, whereby to variably affect the effect of the fixed wings on the rotary wings.

22. An aircraft having as its primary sustention means, a rotor system of pivotally and rotatably mounted sustaining wings or blades arranged for normal actuation under the influence of relative air-flow in flight to provide for normal flight of the craft in attitudes varying from substantially horizontal forward translational flight to vertical descent, forward propulsion means, supplemental and normally fixed sustaining wings disposed on the craft below said rotor system, in which construction the supplemental wings have a variable effect on the action of the rotor in different attitudes of flight, and means for adjusting the effective incidence of the fixed wings, whereby to variably affect the effect of the fixed wings on the rotary wings, the last mentioned means including a device arranged to provide control for the adjustment from a cockpit of the craft while in flight.

23. An aircraft having as its primary sustention means, a rotor system of pivotally and rotatably mounted sustaining wings or blades arranged for normal actuation under the influence of relative air-flow in flight to provide for normal flight of the craft in attitudes varying from substantially horizontal forward translational flight to vertical descent, forward propulsion means, supplemental and normally fixed sustaining wings disposed on the craft below said rotor system, in which construction the supplemental wings have a variable effect on the action of the rotor in different attitudes of flight, and means for adjusting the effective incidence of the fixed wings, whereby to variably affect the effect of the fixed wings on the rotary wings, the last mentioned means including aileron surfaces carried by the wings and a mechanism for operating the ailerons as flaps.

24. An aircraft having as its primary sustention means, a rotor system of pivotally and rotatably mounted sustaining wings or blades arranged for normal actuation under the influence of relative air-flow in flight to provide for normal flight of the craft in attitudes varying from substantially horizontal forward translational flight to vertical descent, forward propulsion means, supplemental and normally fixed sustaining wings disposed on the craft below said rotor system with an incidence and contour such that the proportional lift as between the rotative and fixed wing means varies with changes in the attitude of the craft, the fixed wing means further being so constructed and located that the rate of change of said proportion varies as between different zones of the range of change in attitude.

25. In an aircraft of the type capable of rapid forward flight and approximately vertical descent on substantially an even keel, a fuselage or body, means of forward propulsion, an empennage or tail, a main sustaining system comprising a rotor continuously turning during flight operation including a normally freely rotative axis structure and wings or aerofoils pivotally or oscillatively mounted thereon in position to be autorotatively actuated by relative air-flow, said rotor being disposed above the body of the craft at such distance as to provide ample clearance between the rotary wings and the propulsion means and tail, whereby the center of gravity of the craft as a whole is raised above the center of pressure of the effective vertical or side area of the fuselage proper, and the center of the rotor being located generally vertically above the center of gravity of the craft as a whole, by which construction the support of the craft from the rotor is stable in vertical descent and at low forward speeds but tends to be decreasingly stable with increase in forward speed due to said relation of the center of gravity and the center of pressure, and normally fixed aerofoil means or fin surfacing disposed below the field of rotation of the rotor and of relatively small area but so positioned with respect to the center of gravity and the forward flight direction of the craft that its effective aerodynamic reaction during a turn passes above said center of gravity and produces a progressively increasing tendency toward lateral stability with progressive increase in forward speed of the craft, whereby to approximately compensate, at all forward speeds, for the variation in the stability of support of the craft from the rotor.

26. In an aircraft, a main sustaining system of freely rotative wings and an upwardly-extending axis therefor, which together form a rotor continuously actuated by relative air-flow while the craft is in flight, and supplemental fixed wing means of such contour and so located with respect to the craft and the rotor axis that when the aircraft is in an attitude to the relative flight-wind in which the rotor as a whole assumes a "no-lift" attitude to said flight-wind the fixed wings give a small negative lift or downward force.

27. In an aircraft, a main sustaining system of freely rotative wings and an upwardly-extending axis therefor, which together form a rotor continuously actuated by relative air-flow while the craft is in flight, and supplemental fixed wing means so constructed and arranged with respect to the craft and the rotor axis that when the aircraft is in an attitude to the relative flight-wind in which the rotor as a whole assumes a "no-lift" attitude to said flight-wind the fixed wings give a small negative lift or downward force, the contour and longitudinal location of the fixed wings being such that the projected line of their lift passes forwardly of the center of gravity of the aircraft when they are lifting positively and rearwardly of the center of gravity when they are lifting negatively.

JUAN DE LA CIERVA.